Patented July 3, 1945

2,379,586

UNITED STATES PATENT OFFICE 2,379,586

VITAMIN PRODUCT AND PROCESS OF MANUFACTURE

Paul D. V. Manning, Berkeley Woods, and Elmer Trone, San Francisco, Calif., assignors to Golden State Company, Ltd., San Francisco, Calif., a corporation of Delaware No Drawing. Application March 29, 1941, Serial No. 385,940

3 Claims. (Cl. 99—11)

This invention relates generally to vitamin food products and to processes for their manufacture.

It is the general object of the invention to provide a food product in the form of cow's milk, fortified with respect to its vitamin content. More particularly, it is an object of the invention to provide a product of this kind which can be distributed to the trade in the same manner as bottled milk, and which will afford both fat and water soluble vitamins for a daily human diet. In this connection, the product is preferably fortified with respect to such vitamins as vitamin A, $B_1$, $B_2$, C, nicotinic acid and calcium pantothenate.

Another object of the invention is to provide a product of the above character which will have a pleasing flavor, and which will be highly palatable and nutritious.

Another object of the invention is to provide a vitamin fortified milk having some inherent ability to withstand the catalytic action of light in deteriorating certain vitamins.

A further object of the invention is to provide a novel process for preparing the product.

The properties of this product can best be understood after a description of the preferred process employed for its preparation. As a source of vitamin A, we make use of carotin, particularly since carotin does not tend to develop an unpleasant flavor or odor when the product is exposed to the air, as is the case with a vitamin A concentrate extracted from fish oil. Also, we have found that carotin imparts to the product a desirable yellow or golden color, which is advantageous for reasons which will presently be explained. To effectively introduce carotin into the milk, we first thoroughly dissolve carotin in pure, sterilized butter oil, and then a suitable amount of this butter oil is intermixed with whole milk, and the mixture homogenized.

The butter oil for dissolving the carotin can be prepared by first subjecting ordinary butter to a purification process. Thus, a suitable amount of fresh butter of best grade is melted in a jacketed kettle, and water and a part of the milk solids decanted off. It is then subjected to a vacuum to evaporate remaining water. Some remaining milk solids are now removed by filtration. The purified butter oil obtained in this fashion is then carefully weighed and placed in a jacketed kettle and is heated to an elevated temperature of approximately 120° C. with some agitation, and while the mass is subjected to a relatively high vacuum. This treatment serves to thoroughly dehydrate and sterilize the oil, and to remobe the dissolved oxygen.

While the butter oil is heated to an elevated temperature of the order of 120° C. under vacuum, the desired amount of carotin is introduced, and the material gently agitated. The vacuum is maintained for a short time in order to insure removal of any moisture contained in the carotin. Carotin is a crystalline solid at ordinary temperature. At the elevated temperature specified, the carotin readily dissolves in the butter oil. This operation is relatively critical with respect to the temperature employed, because at lower temperatures of the order of 110° C. or lower, the carotin does not properly dissolve, and at higher temperatures such as in excess of 130° C., there is a destructive effect upon the carotin resulting in loss with development of an off flavor.

An inert anhydrous gas, such as nitrogen, which has been dried and passed through a bacterial filter, is then admitted to the kettle so that the next steps can be carried out at atmospheric pressure.

This oil is now placed in bottles or cans of suitable size, sealed and immediately cooled, and kept under refrigeration. The containers should be of such size that the desired amount of carotin in butter oil fills them completely or the head space should be filled with nitrogen to prevent oxidation of carotin.

After being placed in small containers, it is chilled at once by refrigeration to approximately 32° F. Chilling to a temperature much colder may cause the carotin to crystallize out and this must be avoided as in the form of crystals it would not be possible to properly disperse the same in milk.

To proceed with the preparation of a product in which the above oil is incorporated, a proper amount of this oil, depending upon the units of carotin desired in the final material, is first melted by heating quickly to about 100° C. and maintaining it at that temperature until ready to be added to the milk. It is mixed with a small amount of fresh pasteurized whole milk. This mixture is then subjected to homogenizing under suitable temperatures and pressure, as for example, a temperature of the order of 150° F. This homogenized liquid is then mixed with an additional amount of fresh pasteurized whole milk, and the mixture is again subjected to homogenizing treatment at suitable temperatures and pressures, in the same manner as the first homogenizing treatment. This homogenized material is then immediately chilled by passing through a refrigerated cooler.

Assuming that the product is to be fortified with respect to water soluble vitamins, the vitamins desired are mixed together in a small amount of sterilized distilled water, and a suitable amount of this water then gradually added to the homogenized product, with gentle agitation in order to avoid possible coagulation. The final product can then be bottled and distributed to the trade. As water soluble vitamins, I can make use of vitamin C, together with such additional vitamins and vitamin-like materials as one may desire. In actual practice, I have made use of vitamins $B_1$ and $B_2$, nicotinic acid, calcium pantothenate, together with the vitamin C.

It is desirable but not always feasible to deaerate the milk before the addition of water soluble vitamins. If this is done, little or no loss of vitamin C takes place. Deaeration can be carried out by heating to a temperature such as 160° F. followed by flashing to a lower temperature such as 120 to 130° F. in an evacuated chamber. Following such deaeration it is difficult to prevent reabsorption of oxygen by contact with air. Excessive loss of vitamin C can be compensated for by addition of a slight excess corresponding to the amount lost by oxidation before the product is consumed.

It is evident that the proportions can vary in accordance with the concentration of the different vitamins and vitamin-like materials desired in the final product. In a typical instance, the amount of vitamins in the final product can be as follows for each pint of the product:

|  | Grams |
|---|---|
| Carotin (6000 units) | 0.0036 |
| $B_1$ (750 units) | 0.00225 |
| $B_2$ | 0.002 |
| Vitamin C | 0.050 |
| Nicotinic acid | 0.010 |
| Calcium pantothenate | 0.010 |

The solution of purified butter oil and carotin can be prepared in suitable proportions such as 25 grams of carotin for each liter of butter oil.

When carotin is incorporated in milk to the extent indicated above, it imparts to the milk a yellow or golden color. When a bottle of this product is subjected to daylight, a considerable proportion of the light rays are intercepted because of the color of the product, and this has the effect of tending to protect the product against deterioration by virtue of the catalytic action of light. In this connection, it is known that vitamin C is subject to deterioration by oxidation, and that this deterioration is accelerated by the catalytic action of light. Therefore, the carotin content in effect tends to protect the vitamin C content against deterioration.

The procedure specified for incorporating the carotin content into purified butter oil at an elevated temperature insures complete and homogeneous ultimate incorporation of the carotin content in the homogenized product. Since carotin is normally a crystallized solid, its imperfect incorporation into the product would render the product unsaleable.

We claim:

1. In a vitamin product, homogenized cow's milk fortified with both carotin and vitamin C, the carotin content being sufficient to impart a golden color to the product which is substantially deeper than the color of normal cow's milk so as to protect the vitamin C content against the catalytic action of light.

2. In a vitamin product, homogenized cow's milk fortified with dissolved carotin to an amount of the order of 0.0036 grams per pint of milk, and also fortified with vitamin C, the carotin content serving to impart a golden color which protects the vitamin C against the catalytic action of light.

3. In a vitamin product, homogenized cow's milk with additional butter oil containing dissolved carotin, whereby the carotin is uniformly distributed throughout the product and imparts to the product a golden color, the product also being fortified with respect to vitamin C, the golden color imparted to the product by the added carotin being substantially deeper than the color of normal cow's milk and serving to protect the vitamin C against the catalytic action of light.

PAUL D. V. MANNING.
ELMER TRONE.